United States Patent
Karnagel et al.

(10) Patent No.: US 11,544,630 B2
(45) Date of Patent: Jan. 3, 2023

(54) AUTOMATIC FEATURE SUBSET SELECTION USING FEATURE RANKING AND SCALABLE AUTOMATIC SEARCH

(71) Applicant: ORACLE INTERNATIONAL CORPORATION, Redwood Shores, CA (US)

(72) Inventors: Tomas Karnagel, Zurich (CH); Sam Idicula, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 674 days.

(21) Appl. No.: 16/417,145

(22) Filed: May 20, 2019

(65) Prior Publication Data

US 2020/0118036 A1 Apr. 16, 2020

Related U.S. Application Data

(60) Provisional application No. 62/745,587, filed on Oct. 15, 2018.

(51) Int. Cl.
*G06N 20/20* (2019.01)
*G06N 5/04* (2006.01)

(52) U.S. Cl.
CPC ............. *G06N 20/20* (2019.01); *G06N 5/048* (2013.01)

(58) Field of Classification Search
CPC ........ G06N 20/10; G06N 20/20; G06N 3/006; G06N 3/0454; G06N 3/0481; G06N 3/084;
(Continued)

(56) References Cited

U.S. PATENT DOCUMENTS 6,789,069 B1   9/2004 Barnhill
10,489,215 B1  11/2019 Wen
(Continued)

FOREIGN PATENT DOCUMENTS

EP   2 128 798 A1   12/2009

OTHER PUBLICATIONS

Bolon-Canedo et al., "Distributed feature selection: An application to microarray data classification", May 2015, Applied Soft Computing, vol. 30, May 2015, pp. 136-150 (Year: 2015).*
(Continued)

*Primary Examiner* — Brent Johnston Hoover
(74) *Attorney, Agent, or Firm* — Hickman Becker Bingham Ledesma LLP; Brian N. Miller (57) ABSTRACT

The present invention relates to dimensionality reduction for machine learning (ML) models. Herein are techniques that individually rank features and combine features based on their rank to achieve an optimal combination of features that may accelerate training and/or inferencing, prevent overfitting, and/or provide insights into somewhat mysterious datasets. In an embodiment, a computer calculates, for each feature of a training dataset, a relevance score based on: a relevance scoring function, and statistics of values, of the feature, that occur in the training dataset. A rank based on relevance scores of the features is calculated for each feature. A sequence of distinct subsets of the features, based on the ranks of the features, is generated. For each distinct subset of the sequence of distinct feature subsets, a fitness score is generated based on training a machine learning (ML) model that is configured for the distinct subset.

20 Claims, 5 Drawing Sheets

(58) Field of Classification Search
CPC ........ G06N 3/088; G06N 3/126; G06N 5/003; G06N 5/048; G06N 7/005
See application file for complete search history.

(56) References Cited

U.S. PATENT DOCUMENTS

| | | | |
|---|---|---|---|
| 10,554,738 B1 | 2/2020 | Ren | |
| 10,606,649 B2 | 3/2020 | Baggerman | |
| 10,832,158 B2 | 11/2020 | Liu | |
| 10,936,589 B1 | 3/2021 | Beitchman | |
| 2002/0169735 A1 | 11/2002 | Kil et al. | |
| 2008/0097938 A1* | 4/2008 | Guyon | G06N 20/00 706/12 |
| 2010/0153956 A1 | 6/2010 | Capps, Jr. | |
| 2016/0004621 A1 | 1/2016 | Gongloor | |
| 2016/0358099 A1 | 12/2016 | Sturlaugson et al. | |
| 2017/0068675 A1 | 3/2017 | Hazel | |
| 2018/0022539 A1 | 1/2018 | Vedani | |
| 2018/0046926 A1 | 2/2018 | Achin | |
| 2018/0107711 A1 | 4/2018 | Tariq | |
| 2018/0225391 A1 | 8/2018 | Sali et al. | |
| 2018/0349986 A1* | 12/2018 | Fidanza | G06N 20/00 |
| 2018/0357511 A1* | 12/2018 | Misra | G06K 9/6262 |
| 2018/0357541 A1* | 12/2018 | Chen | G06N 3/04 |
| 2019/0042867 A1* | 2/2019 | Chen | G06N 3/063 |
| 2019/0340095 A1 | 11/2019 | Faibish | |
| 2019/0347511 A1* | 11/2019 | Jiang | G06N 3/08 |
| 2019/0392255 A1 | 12/2019 | Franklin | |
| 2020/0034197 A1 | 1/2020 | Nagpal | |
| 2020/0074306 A1* | 3/2020 | Giral | G06N 20/20 |
| 2020/0082013 A1 | 3/2020 | Triplet et al. | |
| 2020/0125545 A1 | 4/2020 | Idicula | |
| 2020/0125568 A1 | 4/2020 | Idicula | |
| 2020/0302318 A1 | 9/2020 | Hetherington | |
| 2020/0327357 A1 | 10/2020 | Karnagel | |
| 2020/0327448 A1 | 10/2020 | Yakovlev | |
| 2021/0390466 A1 | 12/2021 | Varadarajan et al. | |

OTHER PUBLICATIONS

Yakovlev, U.S. Appl. No. 16/384,588, filed Apr. 15, 2019, Non-Final Rejection dated Sep. 16, 2021.
Idicula, U.S. Appl. No. 16/382,085, filed Apr. 11, 2019, Office Action dated May 19, 2021.
Idicula, U.S. Appl. No. 16/382,085, filed Apr. 11, 2019, Notice of Allowance and Fees Due dated Nov. 3, 2021.
Chandrashekar et al., "A survey on feature selection methods", Computers and Electrical Engineering 40 dated 2014, 13 pages.
Jennie Duggan et al., . Performance Prediction for Concurrent Database Workloads SIGMOD, dated 2011, 12 pages.
Hutter et al., "Automatic Machine Learning: Methods, Systems, Challenges", dated Oct. 16, 2018, 250 pages.
Holte, Robert, "Very Simple Classification Rules Perform Well on Most Commonly Used Datasets", 1993 Kluwer Academic Publishers, Boston. Manufactured in The Netherlands, 28 pages.
Guyon et al., "An Introduction to Variable and Feature Selection", Journal of Machine Learning Research 3 dated 2003, 26 pages.
Goodfellow et al., "Explaining and Harnessing Adversarial Examples", Published as a conference paper at ICLR dated 2015, 11 pages.
Ganapathi, A. et al. "Predicting multiple performance metrics for queries: Better decisions enabled by machine learning", ICDE 2009, 12 pages.
Furnkranz et al., "An Evaluation of Landmarking Variants", dated 2001, 12 pages.
Filchenkjov et al., "Datasets Meta-Feature Description for Recommending Feature Selection Algorithm", dated Nov. 2015, 9 pages.
Feurer et al., "Initializing Bayesian Hyperparameter Optimization via Meta-Learning", Proceedings of the Twenty-Ninth AAAI Conference on Artificial Intelligence dated 2015, 8 pages.
Fayyad, "Multi-Interval Discretization of Continuous-Valued Attributed for Classification Learning", dated 1993, 6 pages.

"Decision Trees", dated Jan. 26, 2005, 10 pages.
Dougherty et al., "Supervised and Unsupervised Discretization of Continous Features", dated 1995, 9 pages.
Lakkaraju et al., "Interpretable & Explorable Approximations of Black Box Models", KDD, dated 2017, 5 pages.
Castiello et al., "Meta-data: Characterization of Input Features for Meta-learning", Springer-Verlag Berlin Heidelberg dated 2005, 13 pages.
Brown et al., "Conditional Likelihood Maximisation: A Unifying Framework for Information Theoretic Feature Selection", Journal of Machine Learning Research 13 (2012), 40 pages.
Brazdil, Pavel, "Metalearning and Algorithm Selection: Progress, State of the Art and Introduction of the 2018 Special Issue", dated Dec. 2017, 23 pages.
Brazdil et al., "Ranking Learning Algorithms: Using IBL and Meta-Learning on Accuracy and Time Results", dated 2003 Kluwer Academic Publishers. Manufactured in The Netherlands, 27 pages.
Bensusan et al., "Discovering Task Neighbourhoods through Landmark Learning Performances", Springer-Verlag Berlin Heidelberg dated 2000, 6 pages.
Bensusan et al., "Casa Batlo is in Passeig de Gracia or how landmark performances can describe tasks", dated 2000, 19 pages.
Baehrens et al., "How to Explain Individual Classification Decisions", Journal of Machine Learning Research 11 dated 2010, 29 pages.
B. Debnath et al., SARD: A statistical approach for ranking database tuning parameters. In ICDEW, pp. 11-18, dated 2008.
Albon, Chris, "ANOVA F-Value for Feature Selection", dated Dec. 20, 2017, 2 pages.
Agrawal et al., "Fast Discovery of Association Rules", dated 1996, 22 pages.
Duan et al., "Tuning Database Configuration Parameters with iTuned", VLDB dated 2009, 12 pages.
Narendra et al., "A Branch and Bound Algotithm for Feature Subset Selection", IEEE Transactions on Computers, vol. C-26, No. 9, dated Dec. 1977, 6 pages.
Van Aken et al., "Automatic Database Management System Tuning Through Large-scale Machine Learning," Proceedings of the 2017 ACM International Conference on Management of Data, 2017, pp. 1009-1024.
Utgoff, Paul, "Incremental Induction of Decision Trees", 1989 Kluwer Academic Publishers, Boston. Manufactured in The Netherlands, 26 pages.
Sullivan et al., "Using probabilistic reasoning to automate software tuning", In SIGMETRICS, dated 2004, 13 pages.
Sameketal, "Explainableartificialintelligence: Understanding, Visualizingand Interpreting Deep Learning Models", ITU Journal: ICT Discoveries, Special Issue No. 1, Oct. 13, 2017, 10 pages.
Robnik-Sikonja et al., "Explaining Classifications for Individual Instances", IEEE Transactions on Knowledge and Data Engineering, 20:589-600, dated 2008, 24 pages.
Ribeiro et al., "Why Should I Trust You?" Explaining the Predictions of Any Classifier, Publication rights licensed to ACM, dated 2016, 10 pages.
Reif et al., "Prediction of Classifier Training Time including Parameter Optimization", dated Oct. 2011, 13 pages.
Reif et al., "Meta-learning for evolutionary parameter optimization of classifiers, Machine Learning", dated 2012, 24 pages.
Ramirez-Gallego et al., "Data discretization: taxonomy and big data challenge", WIREs Data Mining Knowl Discov 2015, 17 pages.
Quinlan et al., "Induction of Decision Trees", dated 1986 Kluwer Academic Publishers, Boston—Manufactured in The Netherlands, 26 pages.
Jin et al., "Data discretization unification", Regular Paper, Springer-Verlag London Limited 2008, 29 pages.
Peskov'a et al., "Hybrid Multi-Agent System for Metalearning in Data Mining", dated Sep. 19, 2014, 2 pages.
Kohavi, Ron, "Wrappers for Performance Enhancement and Oblivious Decision Graphs", dated Sep. 1995, 304 pages.
Narayanan et al., "Continuous resource monitoring for self-predicting DBMS", IEEE International Symposium on Modeling, Analysis and Simulation of Computer and Telecommunication Systems, 2005, 10 pages.

(56) References Cited

OTHER PUBLICATIONS

Molina et al., "Feature Selection Algorithms: A Survey and Experimental Evaluation", dated 2002, 19 pages.
Microsoft Docs, "Feature Selection Modules", dated May 5, 2019, 7 pages.
Lindne et al., "AST: Support for Algorithm Selection with a CBR Approach", Springer-Verlag Berlin Heidelberg 1999, 6 pages.
Lin et al., "Experiencing SAX: a novel symbolic representation of time series", Data Min Knowl Disc (2007), 38 pages.
Lim et al., "A Comparison of Prediction Accuracy, Complexity, and Training Time of Thirty-Three Old and New Classification Algorithms", dated 2000, 26 pages.
Letham et al., "Interpretable classifiers using rules and Bayesian analysis: Building a better stroke prediction model", vol. 9, No. 3, dated 2015, 2 pages.
Letham et al., "Interpretable Classifiers Using Rules and Bayesian Analysis: Building a Be 1 1 Er Stroke Prediction Model", The Annals of Applied Statistics, dated 2015, vol. 9, No. 3, 23 pages.
Lemke et al., "Metalearning: a survey of trends and technologies", Artif Intell Rev dated 2015,14 pages.
Lakkaraju et al., "Interpretable Decision Sets: A Joint Framework for Description and Prediction", KDD, PMC dated Nov. 14, 2016, 24 pages.
Zilio, D.C.A. "DB2 design advisor: integrated automatic physical database design" VLDB dated 2004, Proceedings of the Thirtieth international conference on Very large data bases, 11 pages.
Pudil et al., "Floating Search Methods in Feature Selection", dated Jun. 19, 1993, 9 pages.
Singh et al., "Literature Review on Feature Selection Methods for High-Dimensional Data", International Journal of Computer Applications, vol. 136, No. 1, dated Feb. 2016, 9 pages.
Parmezan et al., "Metalearning for Choosing Feature Selection Algorithms in Data Mining: Proposal of a New Framework", Preprint submitted to Expert Systems with Applications, Nov. 4, 2016, 66 pgs.
Microsodt Docs, "Feature Selection in the Team Data Science Process", dated Nov. 20, 2017, 5 pages.
Li et al., "Feature Selection: A Data Perspective", AMC, Computer Suru 9, Article 39, dated Mar. 2010, 45 pages.
Krupka et al., "Learning to Select Features using their Properties", Journal of Machine Learning Research 9, dated 2008, 28 pages.
Hutter et al., Algorithm Runtime Prediction: Methods & Evaluation, Artificial Intelligence 206, Oct. 2013, 33 pages.
Amasyali et al., "A Study of Meta Learning For Regression", http://docs.lib.purdue.edu/ecetr, dated Jul. 1, 2009, 26 pages.
Duggan, et al., 'Performance Prediction for Concurrent Database Workloads', p. 337-348, SIGMOD'11, Jun. 12-16, 2011, Athens, Greece, 12pgs.
Prasad et al., "Distributed Feature Selection Using Vertical Partitioning for High Dimensional Data", ICACCI, dated Sep. 12, 2016, 8 pages.
Moran-Fernandez et al., "Centralized vs. Distributed Feature Selection Methods Based on Data Complexity Measures", Knowledge-based Systems, dated Sep. 28, 2016, 20 pages.
Bolon-Canedo et al., "Distributed Feature Selection: An Application to Microarray Data Classification", Applied Soft Computing, dated Feb. 7, 2015, 16 pages.
Lin et al., "Experiencing SAX: a novel symbolic representation of time series", dated Apr. 3, 2007, 38 pages.
Abe et al., "Developing an Integrated Time-Series Data Mining Environment for Medical Data Mining", Seventh IEEE International Conference on Data Mining Workshops, dated 2007, 6 pages.
Ahmed et al., "An Empirical Comparison of Machine Learning Models for Time Series Forecasting", dated Sep. 15, 2010, 31 pages.
Amazon SageMaker, "DeepAR Forecasting Algorithm", https://docs.aws.amazon.com/sagemaker/latest/dg/deepar.html,last viewed on Jun. 29, 2020, 5 pages.
Artificial Intelligence Blog, "Announcing automated ML capability in Azure Machine Learning", dated Sep. 24, 2018, 8 pages.
Brownlee, Jason, "Time Series Forecasting as Supervised Learning", dated Aug. 21, 2019, 2 pages.
Camerra et al., "Beyond one billion time series: indexing and mining very large time series collections with iSAX2+", dated Feb. 16, 2013, 29 pages.
"Machine Learning Approaches for Time Series Data" dated May 19, 2019, 25 pages.
Kraska, Tim, "Northstar: an Interactive Data Science System", Proceedings of the VLDB Endowment, vol. 11, No. 12 Copyright 2018 VLDB Endowment, 15 pages.
Wang et al., "Experimental comparison of representation methods and distance measures for time series data", dated Feb. 12, 2010, 35 pages.
Ng, "Data preprocessing for machine learning: options and recommendations", dated Jun 22, 2020, 12 pages.
Olson et al., "Evaluation of a Tree-based Pipeline Optimization Tool for Automating Data Science", dated Mar. 20, 2016, 8 pages.
Oracle, "The Oracle AutoML Pipeline" Four Main Stages, https://docs.cloud.oracle.com/en-us/iaas/tools/ads-sdk/latest/user_guide/automl/overview.html, dated Apr. 28, 2020 or later, 4 pages.
Paoli et al., "Forecasting of preprocessed daily solar radiation time series using neural networks", Solar Energy, Elsevier, dated 2010, 43 pages.
Plotz et al., "Feature Learning for Activity Recognition in Ubiquitous Computing", dated Jan. 2011, 7 pages.
Schoenfeld et al., "Preprocessor Selection for Machine Learning Pipelines", dated 2018, 7 pages.
Song et al., "Deep r-th Root of Rank Supervised Joint Binary Embedding for Multivariate Time Series Retrieval", KDD 2018, dated Aug. 19-23, 2018, London, United Kingdom, 10 pages.
Faloutsos et al., "Fast Subsequence Matching in Time Series Databases", dated 1998, 11 pages.
Idicula, U.S. Appl. No. 16/382,085, filed Apr. 11, 2019, Restriction Requirement dated Jan. 29, 2021.
Idicula, U.S. Appl. No. 16/298,837, filed Mar. 11, 2019, Notice of Allowance dated Feb. 18, 2021.
Wang et al., "A Feature Subset Selection Algorithm Automatic Recommendation Method", Journal of Artificial Intelligence Research 47, 2013, 34 pages.
Urbanowicz et al., "Relief-Based Feature Selection: Introduction and Review", Apr. 2, 2018, 43 pages.

\* cited by examiner

COMPUTER 300

| | FEATURE SUBSETS 311 | ACCURACY |
|---|---|---|
| RANKING A | 2 | 0.6 |
| | 2,6 | 0.65 |
| | 2,6,8 | 0.7 |
| | 2,6,8,3 | 0.8 |
| | 2,6,8,3,1 | 0.83 |
| | 2,6,8,3,1,4 | 0.89 |
| | 2,6,8,3,1,4,5 | 0.85 |
| | 2,6,8,3,1,4,5,10 | 0.84 |
| | 2,6,8,3,1,4,5,10,9 | 0.84 |
| | 2,6,8,3,1,4,5,10,9,7 | 0.84 |
| RANKING B | 8 | 0.7 |
| | 8,7 | 0.72 |
| | 8,7,5 | 0.72 |
| | 8,7,5,3 | 0.74 |
| | 8,7,5,3,10 | 0.80 |
| | 8,7,5,3,10,1 | 0.79 |
| | 8,7,5,3,10,1,4 | 0.81 |
| | 8,7,5,3,10,1,4,2 | 0.83 |
| | 8,7,5,3,10,1,4,2,9 | 0.84 |
| | 8,7,5,3,10,1,4,2,9,6 | 0.84 |

| COMBINED SUBSETS 312 |
|---|
| 8 |
| 2 |
| 8,7 |
| 2,6 |
| 8,7,5 |
| 2,6,8 |
| 8,7,5,3 |
| 2,6,8,3 |
| 8,7,5,3,10 |
| 2,6,8,3,1 |
| 8,7,5,3,10,1 |
| 2,6,8,3,1,4 |
| 8,7,5,3,10,1,4 |
| 2,6,8,3,1,4,5 |
| 8,7,5,3,10,1,4,2 |
| 2,6,8,3,1,4,5,10 |
| 8,7,5,3,10,1,4,2,9 |
| 2,6,8,3,1,4,5,10,9 |
| 8,7,5,3,10,1,4,2,9,6 |
| 2,6,8,3,1,4,5,10,9,7 |

| CORE A | CORE B | CORE C | CORE D |
|---|---|---|---|
| 2,6,8,3,1,4,5,10,9,7 | 2,6,8,3,1,4,5 | 8,7,5,3,10,1 | 2,6,8,3,1 |
| 2 | 2,6,8 | 2,6,8,3 | 8,7,5,3 |
| | 8 | 2,6 | 8,7 |

AUTOMATIC FEATURE SUBSET SELECTION USING FEATURE RANKING AND SCALABLE AUTOMATIC SEARCH

RELATED APPLICATIONS; BENEFIT CLAIM

This application claims the benefit of Provisional Appln. 62/745,587, filed Oct. 15, 2018 the entire contents of which is hereby incorporated by reference as if fully set forth herein, under 35 U.S.C. § 119(e).

FIELD OF THE INVENTION

The present invention relates to dimensionality reduction for machine learning (ML) models. Herein are techniques that individually rank features and combine features based on their rank to achieve an optimal combination of features that may accelerate training and/or inferencing, prevent overfitting, and/or provide insights into somewhat mysterious datasets.

BACKGROUND

Use of machine learning (ML), such as deep learning (DL), is rapidly spreading through industries and business units and is becoming a ubiquitous tool within some corporations. ML model training may be resource intensive of time and/or space of a computer. An ML model may be configured to process all features that occur in a dataset. However, processing of each feature may cost substantial computer resources. Efficiency may be increased when the ML model does not process some features. However, not all features are logically and/or logistically equal. Indeed, a performance increase may need intelligent selection of which features to process and which features to ignore.

Feature selection may have a strong impact on model performance (e.g., accuracy, f1 score, etc.). Selecting a model's optimal feature subset is exponentially hard and can be extremely time consuming especially for intricate datasets. Because there are $2^n$ possible subset combinations (n=number of features), considering all possible subsets is infeasible. For example, a dataset may have a hundred thousand features.

The following are various previous approaches, all of which have a limited ability to manage the numerosity/combinatorics of possible feature subsets for a given dataset. Filter approaches, based on statistical analysis of feature values and perhaps ignoring the ML model itself, may be prone to deleting important features such as when a filter method or a threshold is inappropriate for the given dataset or ML model involved. With embedded approaches, which leave feature selection to the learning ability of the ML model, processing many features still results in a large model training time or a tendency to overfit, thereby detracting from the two main motivations for feature selection. A serious challenge for wrapper approaches, which treat an ML model as a black box whose sensitivity to features must be empirically explored, is defining feature subsets to evaluate. The main problem with most of the above approaches is their sequential nature. Horizontally scaled parallelism is impractical due to evaluating feature subsets, including model training and testing, in a sequential order. Additionally, an ideal number of features (i.e. target subset size) is typically unknown beforehand.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Approaches herein combine feature ranking criteria with two key improvements: a) using feature ranking to define the order of features, and b) applying a non-sequential search to reduce the number of evaluations, including optimizing for parallel execution. Techniques herein can be directly applied to any (e.g. Oracle) machine learning product that supports feature selection. Scalable automatic search significantly improves overall runtime. Especially in cloud applications, less runtime means less resource usage and cost. Approaches may apply the following novel techniques to automatically select features.

With feature ranking, features are ranked using criteria such as variance, mutual information, or taking feature importance information from a trained model. Then instead of applying a threshold on values, feature subsets are created based on rank order. For example, three features (1, 2, 3) might be ranked with a filter method to 2, 3, 1 in descending order of importance. Feature subsets (2), (2,3), (2,3,1) may be created based on that computed ranking. This reduces the number of considered subsets from $2^n$ (i.e. exponential) to n (i.e. linear).

With ensemble ranking, sometimes a single ranking algorithm cannot fully assess feature importance for all possible datasets. Thus, multiple ranking algorithms are used to complement each other. Each ranking algorithm produces a feature ranking that defines feature subsets for evaluation according to a ranking order. Additionally, there may be ensemble ranking(s) that combining multiple feature rankings into a new ranking. For example, an ensemble ranking can be based on an average of feature scores of all other rankings.

In an embodiment, a computer calculates, for each feature of a training dataset, a relevance score based on: a relevance scoring function, and statistics of values, of the feature, that occur in the training dataset. A rank based on relevance scores of the features is calculated for each feature. A sequence of distinct subsets of the features, based on the ranks of the features, is generated. For each distinct subset of the sequence of distinct feature subsets, a fitness score is generated based on training a machine learning (ML) model that is configured for the distinct subset.

With scalable search, instead of evaluating all n feature subsets or applying a sequential search, an exponential subset-selection function is applied. This function will select many small subsets of features and few large subsets, all based on feature ranking order. The following are multiple reasons for this approach.

Small subsets can be evaluated faster than large subsets, because the size of the dataset and the amount of processing needed are reduced.

The relative size difference is more significant between small subsets than larger ones. For example, having a dataset with 1000 features, it would be desirable to test a 5-feature subset, even knowing that a 10-feature subset is good, because it would reduce the size by half. If a 900-feature subset was found as good, the potential reduction with an 895-feature subset is not significant enough to justify its evaluation.

With avoiding random steps, subset evaluation is based on ranking of normalized feature scores that are scaled between 0 and 1. Features are sorted by their scores. This results in a best feature having a score of 1, which is the top of the ranking, while the worst feature has a score 0 and ranks last. Occasionally, multiple features may have a same score such that ranking order between those features is naturally arbitrary. An embodiment counteracts this effect by not adding a subset for evaluation if the last element of the previous subset has the same scoring value as the last element of the current subset. In this case, the difference between the last and current subset is only based on the random order of features and not according to a value-based ranking. Thus, the current subset need not be evaluated further. This heuristic is also applied for 0-value scores at the lower end of the ranked features. Despite this approach, the full dataset (subset with all features) may be additionally selected for evaluation in case of the following:

The ranking does not reflect the real feature importance, or
All features are important for the prediction.

With scalable search/evaluation, feature subsets are chosen by inspecting a given feature ranking and without any step-wise evaluation beforehand. Thus, composing a subset is fast (i.e. not computationally intensive). Time-consuming evaluation can then be done in parallel by training and testing a target model with the selected subsets. Because these subsets are independent, parallelism can scale up to the number of evaluated subsets. Even without high parallelism, this approach facilitates load balancing with the intrinsic knowledge that smaller subsets can be evaluated faster than larger subsets due to the reduction of the dataset size.

With work stealing, given a cluster of compute nodes (e.g. cores in a CPU or hosts in a computer cluster), evaluation subsets should be scheduled on separate nodes so that the amount of features across all subsets of each node are similar. This will reduce overall runtime, because runtime is usually proportional to the number of features. Furthermore, an embodiment may force larger subsets to be scheduled on different nodes such that the subsets on each node are evaluated in descending order of subset size. This leaves smaller subsets to be evaluated in later stages. If the evaluation on one node takes longer for whatever reason, then this descending order facilitates efficient work stealing of smaller subsets by nodes that already finished their workload.

1.0 Example Computer

Figure 1:
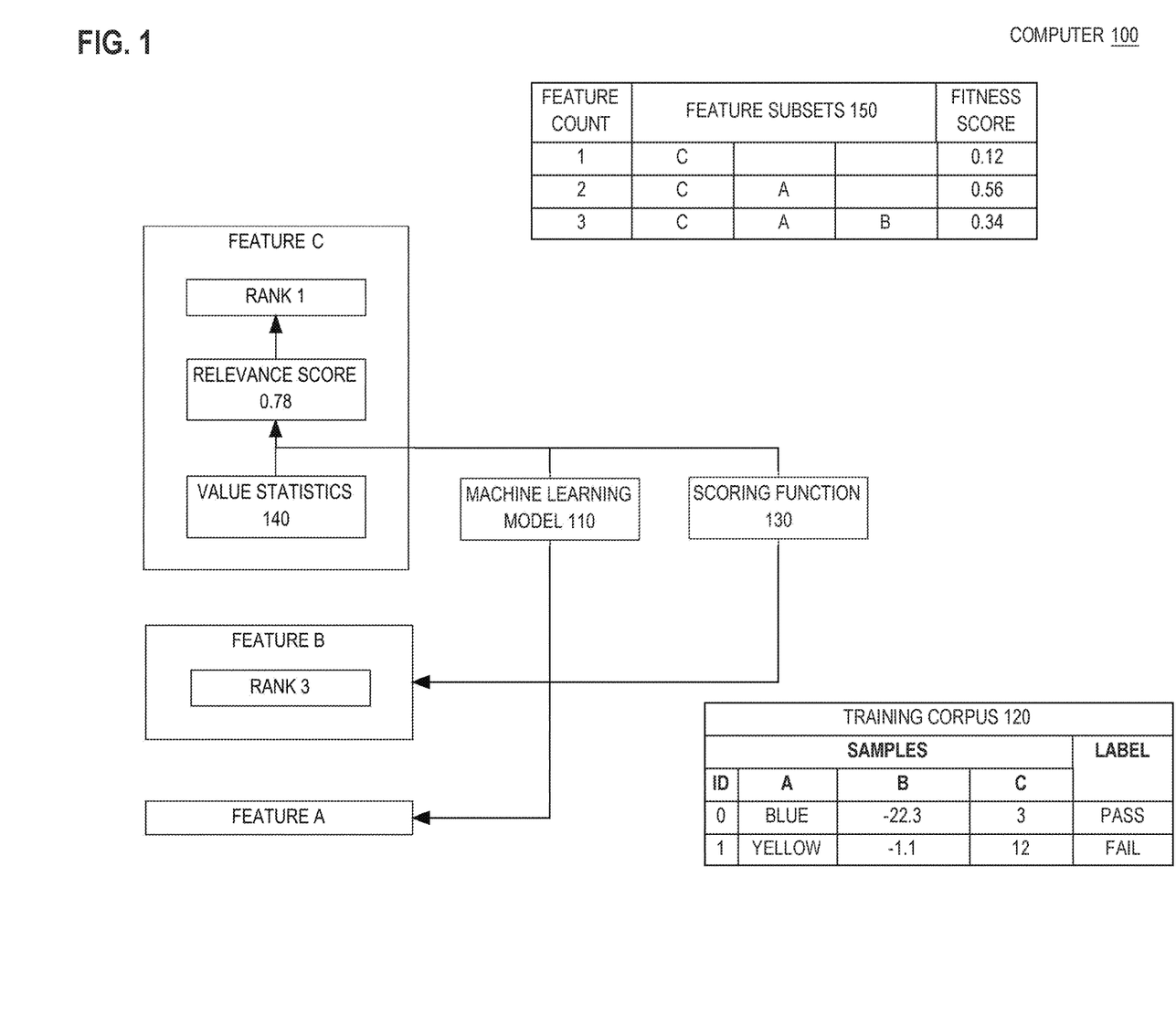
FIG. 1 is a block diagram that depicts an example computer that individually ranks features and combines them based on their rank to achieve an optimal combination of features that may accelerate training and/or inferencing and/or prevent overfitting of a machine learning (ML) model.

FIG. 1 is a block diagram that depicts an example computer 100, in an embodiment. Computer 100 individually ranks features and combines them based on their rank to achieve an optimal combination of features that may accelerate training and/or inferencing and/or prevent overfitting of a machine learning (ML) model. Computer 100 may be one or more of a rack server such as a blade, a personal computer, a mainframe, a virtual computer, or other computing device.

Computer 100 may store, within its memory, ML model 110. Depending on the embodiment, ML model 110 is designed for clustering, classification, regression, anomaly detection, prediction, or dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as scikit-learn (sklearn), Google's TensorFlow for Python and C++ or Georgia Institute of Technology's MLPack for C++. Shogun is an open source C++ ML library with adapters for several programing languages including C#, Ruby, Lua, Java, MatLab, R, and Python.

The lifecycle of ML model 110 has two phases. The first phase is preparatory and entails training, such as in a laboratory. The second phase entails inferencing in a production environment, such as with live and/or streaming data.

During inferencing, ML model 110 is applied to a (e.g. unfamiliar) sample, which may be injected as input into ML model 110. That causes ML model 110 to process the sample according to the internal mechanics of ML model 110, which are specially configured according to reinforcement learning by ML model 110 during previous training. For example if ML model 110 is a classifier, then ML model 110 may select one of multiple mutually exclusive labels (i.e. classifications) for the sample, such as hot and cold.

Whether during training or inferencing, ML model 110 processes samples that may have different values for same features such as A-C. For example, feature A may be color, and feature B may be temperature. Each sample may have a same or different color and a same or different temperature.

Depending on how rich (i.e. multidimensional) are sample data, there may be many more (e.g. hundreds or thousands) features than shown A-C. ML model 110 may have one of many ML model types, and those model types typically have ample logical flexibility to accept and process the very many features of sample data. However, consumption of resources such as time and/or space may be positively correlated with the numerosity of available features.

There may be practical limits as to how many features can ML model 110 process within a given resource budget. Thus in practice, some features should be ignored. However, deciding how many and which features to ignore may impact how accurate can ML model 110 become.

ML model accuracy is an objective metric that may account for a frequency and/or severity of misclassifications. For example, a binary classifier may observe respective frequencies of false positives and false negatives, which may have different semantic severities. For example, mistaking a red traffic light as green may be worse than mistaking a green light as red.

Some features may be noisy or otherwise more or less irrelevant to an inference or inference accuracy. Other features may be more or less correlated to the performance of ML model 110. Computer 100 may detect how relevant are which features such as A-C as follows.

Training ML model 110 may entail processing many samples, which reinforcement learning typically needs. Together, these samples may form a training corpus, such as 120. As shown, training corpus 120 has at least samples 0-1.

Samples 0-1 have many features, including A-C as shown in training corpus 120. Computer 100 has one or more scoring functions 130 that each calculate, for each of features A-C, a relevance scores that estimates how much impact might a feature have upon the accuracy of ML model 110.

In an embodiment, a relevance score of a feature is merely an estimate and not based on actual performance of ML model 110. Thus, scoring function 130 may score features A-C without actually operating ML model 110. In such embodiments, scoring function 130 may operate regardless of whether ML model 110 is trained or not, and may operate in the absence of ML model 110.

Thus depending on the embodiment, the relevance scores of features A-C may be calculated by scoring function 130 with no input other than training corpus 120. For example, scoring function 130 may calculate a relevance score for feature A based solely on the values in column A of training corpus 120. Scoring function 130 may calculate a relevance score that is based on a statistic of the values of a feature, such as variance, such as value statistics 140 for feature C.

Training herein is supervised. Thus, each training sample also has a classification label, as shown in training corpus 120, or other prediction target that ML model 110 may be trained to infer. A feature may be more or less correlated to (i.e. predictive of) the label. For example, most blue samples may be labeled as positive.

Thus, blue may be somewhat predictive of positive and, more generally, color may be somewhat predictive of the classification label. Scoring function 130 may calculate a relevance score that is based on correlation of a feature to the label. In an embodiment, correlation may be calculated according to statistics such as mutual information or F score as discussed later herein. Features that somewhat correlate with classification may have a higher relevance score.

Although ML model 110 may be untrained, scoring function 130 may be based on a configuration of a different ML model (not shown) that is already trained. For example, some kinds of ML models naturally rank features according to relevance/importance. For example with a trained random forest ML model, each feature has a learned feature importance.

Likewise with a trained logistic regression ML model, each feature has a learned feature coefficient. In an embodiment, scoring function 130 may be sensitive to the learned importance or coefficient of a feature. For example, scoring function 130 may use one learned coefficient when scoring feature A and use a different learned coefficient when scoring feature B, although both coefficients come from a same trained regressor (not shown).

Learned feature importance according to an unshown trained model may increase efficiency, such as when the unshown model can be trained much faster than ML model 110 could be trained. For example, the unshown model may have used a much smaller training corpus than 120 or a small subset of 120.

As explained above, there are various (e.g. many) ways to calculate a relevance score of a feature. In an embodiment, scoring function 130 integrates multiple statistics or inputs for a same feature. In an embodiment, each statistic may have its own scoring function, and the scores from multiple functions are integrated to derive an aggregate (e.g. mean) relevance score of a feature.

Once all features A-C have relevance scores, the features can be comparatively ranked according to relevance score. For example, features A-C may be ranked by descending relevance score as shown such that feature C is most important (i.e. rank 1), and feature B is less important (i.e. rank 3). As discussed later herein, features A-C may be redundantly scored by different scoring functions, such as 130, to produce different rankings.

When only one scoring function is available, relevance scores need not be normalized. However, when multiple score functions are used, the scores that they calculate may need (e.g. unit) normalization.

In this example, there is only one ranking, such that features may be ordered by decreasing relevance as C, A, B. Ranking improves the efficiency and effectiveness of feature selection. Without ranking, feature selection may entail exploration that is naturally combinatoric, which can expand exponentially according to a count of available features. Thus, optimal feature selection may be computationally intractable without heuristics such as rank.

Rank indicates feature relevance. Less relevant features may be ignored more or less without impacting accuracy of ML model 110. Thus, each row (i.e. feature subset) of subsets 150 may lack many or most of available features A-C.

Generation of feature subsets within subsets 150 may occur as follows. Each of rows 1-3 of feature subsets 150 is a generated feature subset. The more relevant is a feature, the more subsets/rows that feature occurs in.

First subset 1 has only the most relevant feature C. Each additional row adds an additional feature in order of descending relevance (i.e. ascending rank). Thus, most relevant feature C appears in all rows. Likewise, least relevant feature B appears in only one row.

Thus, each row can be incrementally generated based on the previous row. A consequence of generating feature subsets in that way is that feature subsets 150 has as many rows as there are features. Thus, feature selection scales unit-linearly with feature count. That is a huge improvement over exhaustive combinatoric generation of subsets, which has exponential complexity.

Adding an additional feature to each row of feature subsets 150 causes each subsequent row to implicate more sample data (i.e. more feature columns A-C of corpus 120). More sample data tends to mean better training and more learned accuracy. Thus, there may be a temptation to select last row 3 (i.e. subset with most features) as a best feature subset.

However, there may be a point of diminishing returns, such that adding more features eventually ceases to increase accuracy or may even reduce accuracy. Thus, there is actually a need to empirically test the proposed feature subsets of subsets 150 to detect which subset is truly best within subsets 150. Thus as shown, each row of subsets 150 has a measured fitness score that indicates training accuracy actually achieved for ML model 110 when only the features of that row's subset are used for training.

Thus even though row 3 has more features, row 2 has an optimal feature set because it actually achieves a highest accuracy (i.e. fitness score). Thus, selecting a best (i.e. most accurate) feature subset depends on empirically measured training accuracy. That means that each feature subset in subsets 150 should be used to actually configure and train ML model 110 to empirically measure training accuracy.

Thus, selecting a best feature subset entails multiple trainings of ML model 110, with each training using a different row of subsets 150. Each individual training may be computationally resource intensive of time and/or space. Thus, subsets trainings that scale linearly with available feature count, as explained above, may be a basis of feasibility/tractability.

Better than linear scaling is possible if many rows of subsets 150 are (e.g. selectively) skipped (i.e. not generated and not used for training). For example, computer 100 may selectively sample (i.e. generate and train with) fewer rows than are shown in subsets 150. So long as the last row (i.e. one with all features) is sampled, then no feature is entirely absent from subsets 150, no matter how many other rows are skipped.

In an embodiment, individual rows of subsets 150 are sampled for training according to an exponential sequence, such that increasingly larger groups of contiguous rows of subsets 150 are skipped. Thus, most small subsets are sampled, and most big subsets are not sampled. Because training time depends on feature count, (e.g. no matter how many) small subsets are quickly trained.

Large subsets are less important for two reasons. First, subsets are incrementally built by concatenating features of decreasing relevance, such that a large subset may have many or mostly features of minor relevance. Second, incremental feature concatenation means increasing feature overlap between contiguous subsets, such that two contiguous large subsets are almost entirely identical, whereas the two smallest subsets differ by half of their features.

An exponential sequence of subset sizes (i.e. feature counts) may begin at one and increase by a constant floating point factor greater than one with each subsequent subset to generate. Instead of adding one additional feature with each next subset, an embodiment may add an exponentially increasing amount of additional features, thereby skipping increasingly larger amounts of subsets between each previous and next subset generated. For example if the constant factor is 1.2 and the first size is one, then a next size is 1.2×1, which rounds up to two.

For another size, two is multiplied by 1.2, and so forth. For a training dataset with 10,000 features and a factor of 1.2, this results in 45 subsets of the following sizes: 1, 2, 3, 4, 5, 6, 8, 10, 12, 15, 18, 22, 27, 33, 40, 48, 58, 70, 84, 101, 122, 147, 177, 213, 256, 308, 370, 444, 533, 640, 768, 922, 1107, 1329, 1595, 1914, 2297, 2757, 3309, 3971, 4766, 5720, 6864, 8237, and 9885. Thus, a count of sampled subsets scales logarithmically with available feature count.

In an embodiment, feature relevance scores are unit normalized, such that a highest score is scaled to one. Totally irrelevant features score as zero. In an embodiment, features having a relevance score of zero are excluded from subsets 150. In an embodiment, even excluded features are included in the last (i.e. largest) subset, which includes all features.

Multiple features may have a same relevance score and thus are ranked contiguously. In and embodiment, when some features tie on relevance score, those tied features are all added to a next generated subset. For example if four features are tied, then a next subset is generated instead of incrementally generating four subsets in sequence to add those features.

No matter how many rows are generated and fitness scored for accuracy, an embodiment may finally select a most accurate feature subset. Having selected a best row of subsets 150, computer 100 or another computer may immediately or eventually configure ML model 110 to expect that feature subset. For example, ML model 110 may be configured to expect features A and C, but not B. In an embodiment, unselected features such as B may be removed from training corpus 120. In any case, ML model 110 may then be fully trained with training corpus 120.

2.0 Example Feature Selection Process

Figure 2:
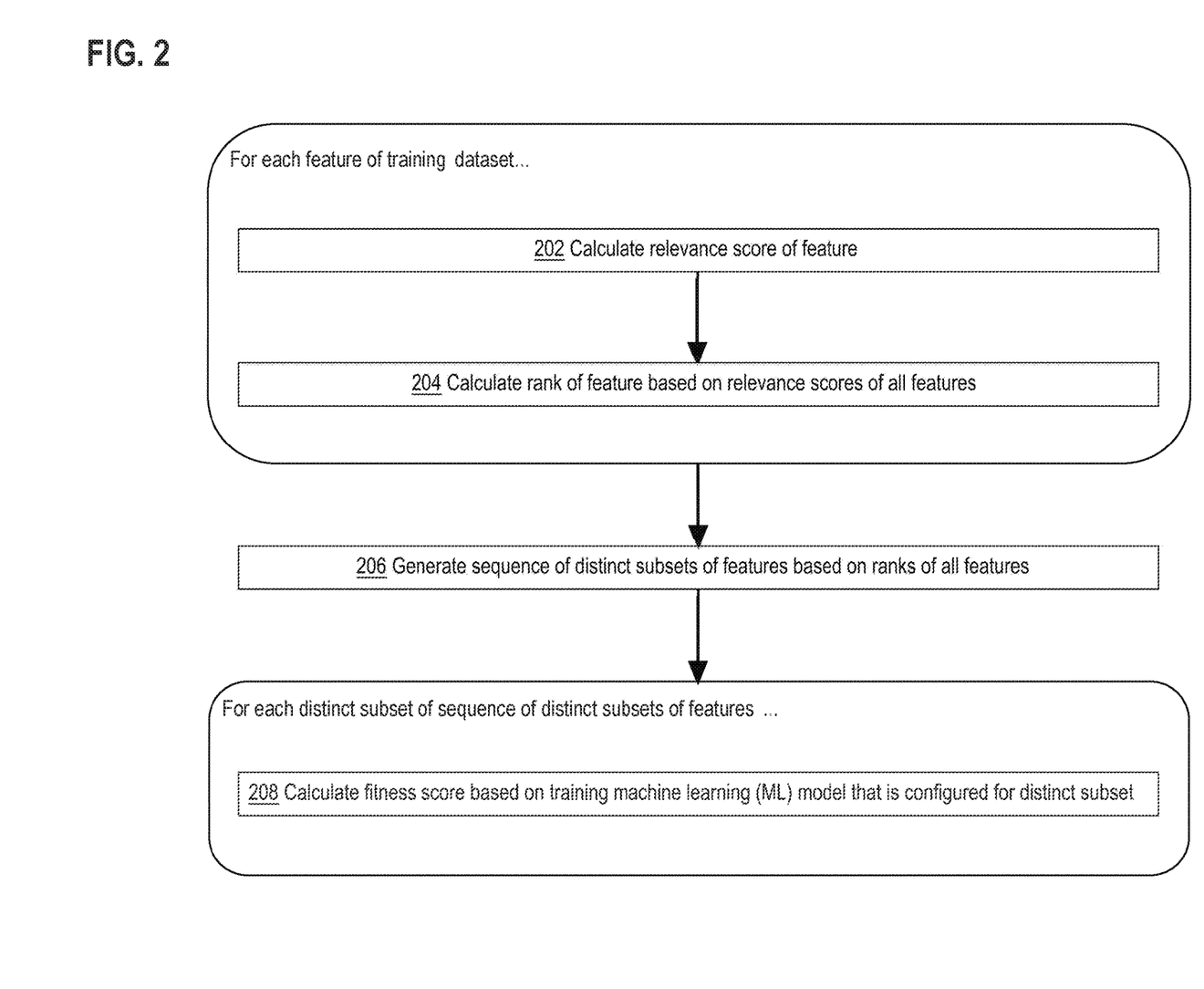
FIG. 2 is a flow diagram that depicts an example computer process for individually ranking features and combining them based on their rank to achieve an optimal combination of features that may accelerate training and/or inferencing and/or prevent overfitting of a machine learning (ML) model.

FIG. 2 is a flow diagram that depicts computer 100 individually ranking features and combining them based on their rank to achieve an optimal combination of features that may accelerate training and/or inferencing and/or prevent overfitting of a machine learning (ML) model, in an embodiment. FIG. 2 is discussed with reference to FIG. 1.

Steps 202 and 204 are preparatory and repeated for each feature, such as A-C, of a training dataset, such as 120. Step 202 calculates a relevance score of each feature, such as shown in feature C as calculated by scoring function 130 and based on value statistics 140 as discussed above. In an embodiment, scores of multiple features A-C are concurrently calculated. In an embodiment, step 202 does not refer to ML model 110 or the configuration of ML model 110. In an embodiment, feature scores can be reused with ML models other than 110.

Step 204 ranks (e.g. sorts) features A-C by relevance score. Thus, step 204 distinguishes more or less important features from more or less unimportant features.

Steps 206 and 208 may concurrently occur. For example, step 206 may repeatedly invoke step 208 as follows. Step 206 generates a sequence of distinct subsets of features. The first subset of the sequence consists of the top ranked (i.e. most important) feature, such as C. Each subsequent subset may be an incremental expansion of the previously generated feature subset based on adding a most important feature that has not already been added, such as A.

When step 206 generates a next feature subset in the sequence, step 208 may asynchronously and/or more or less immediately be repeated for that feature subset. Step 208 configures ML model 110 according to a feature subset that was generated by step 206. Step 208 also trains ML model 110 with training corpus 120 and measures fitness (e.g. accuracy) achieved by that training.

Training during step 208 is the slowest part of FIG. 2 due to computational intensity. An embodiment may distribute each occurrence of step 208 to a computer of a cluster for acceleration by coarse-grained horizontal scaling. Pending occurrences of step 208 may be deferred (e.g. queued as backlog) and eventually individually dispatched, such as into the cluster or a thread pool. An implementation of ML model 110 may exploit multiple cores, threads, or computers for a single training (e.g. occurrence of step 208). An implementation of ML model 110 may exploit data parallelism such as with single instruction multiple data (SIMD) instructions or other vector hardware.

Each occurrence of step 208 generates a fitness score for a distinct feature subset. Thus after step 208 has occurred for all generated feature subsets, each subset has a fitness score, and a highest-fitness feature subset(s) may be identified. For example, the process of FIG. 2 may select the best of the generated feature subsets.

3.0 Multiple Ranks and Processors

Figure 3:
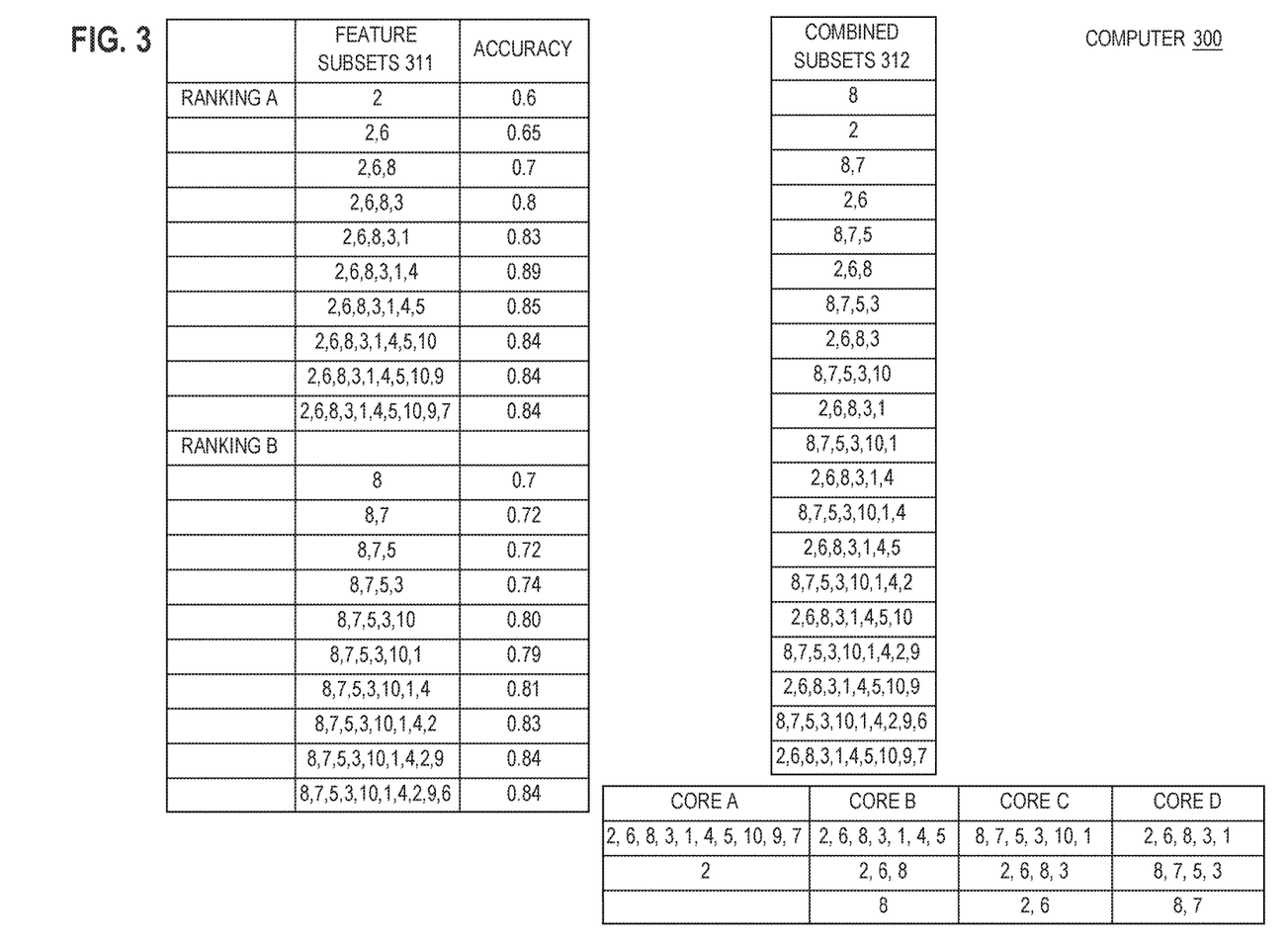
FIG. 3 is a block diagram that depicts an example computer that exploits multiple feature scoring functions to increase accuracy and multiple computational processors (e.g. CPU cores) for acceleration.

FIG. 3 is a block diagram that depicts an example computer 300, in an embodiment. Computer 300 exploits multiple feature scoring functions to increase accuracy and multiple computational processors (e.g. CPU cores) for acceleration. Computer 300 may be an implementation of computer 100.

As discussed above, computer 300 may have multiple feature scoring functions (not shown), each of which achieves a different ranking, such as A-B, of features 1-10, shown as feature subsets 311. For example in ranking A, feature 2 is most important, and feature 7 is least important. Whereas in ranking B, feature 8 is most important, and feature 6 is least important.

The feature subsets of subsets 311 are originally segregated into rankings A-B according to which scoring function was involved. At least those feature subsets may be further aggregated as combined subsets 312. Subsets may be merged in their entirety. In an embodiment, each subset of rankings A-B is included or not in subsets 311 according to criteria that may include relevance score and/or rank.

Computer 300 multi-processes in an implementation dependent way. For example, computer 300 may be an individual computer with a single CPU that contains multiple processing cores A-D for symmetric multiprocessing (SMP). Computer 300 may have multiple CPUs and/or general purpose coprocessors.

Computer 300 may be (e.g. cluster of) multiple interconnected computers, such that each of cores A-D is a separate computer. Computer 300 may be a combination of different such topologies. Computer 300 may be a computer cloud with elastic horizontal scaling.

After subsets selection to obtain feature subsets 312, each subset is used to configure and train an ML model (not shown) to measure the training accuracy of each subset. For example, a best feature subset may be determined. As a multiprocessor, computer 300 may use task (i.e. coarse grained) parallelism to asynchronously train the ML model, with each of cores A-D training with a distinct feature subset.

In an embodiment, all of subsets 312 reside in a central repository from which cores A-D may independently and asynchronously take (i.e. pull) a next subset to train with. When a core finishes training with one subset, that core may take another pending subset from the central repository to train with, until the central repository is empty, and all of subsets 312 have been fitness scored for accuracy. Depending on the embodiment, the central repository may have an unordered heap of subsets or an ordered queue.

In an embodiment, the queue is ordered by descending count of features in each subset. For example, combined subsets 312 may be a queue, with cores A-D pulling next subsets from the queue's head (i.e. bottom as shown), not the queue's tail (i.e. top as shown). In an embodiment, ties are resolved by descending relevance score of each subset's least relevant feature.

In an embodiment, equal counts of subsets of all of subsets 312 are initially dispatched to cores A-D. In an embodiment, subsets are initially dispatched as round robin to cores A-D, ordered by descending feature count (i.e. big subsets before little subsets). Thus, all of cores A-D have a same amount of subsets, and each core has some big subsets and some small sub sets.

In the shown embodiment, cores A-D may have differing amounts of subsets, but a same total amount of features. For example as shown, each core has a total of eleven features. In a work stealing embodiment, an idle core that finished early may steal a pending subset from a busy core. In an embodiment, a core being stolen from may reject an attempted theft if that core has no extra subset to share. In an embodiment, the stolen subset is a biggest (i.e. most features) extra subset whose processing has not yet begun on the core being stolen from. In an embodiment, each of cores A-D arrives at a same global synchronization barrier when the core has no more subsets to process (e.g. and no more subsets to steal).

4.0 Example Implementation

In an embodiment, rankings may be based on some or all of the following named mathematical artifacts that are provided by the python sklearn library:

Mutual information (mutual_info_classif, mutual_info_regression)

Analysis of variation (ANOVA) F score (f_classif, f_regression)

feature_importances of a trained RandomForestClassifier or RandomForestRegressor feature_importances of a trained AdaBoostClassifier or AdaBoostRegressor For example, a ML model may be used for classification that yields probabilities that an input fits several mutually exclusive discrete classes (e.g. circle, rectangle), or for regression that yields a continuous output (e.g. a house value based on comparable houses). Correlation between a feature and the prediction target (i.e. label) can be measured as an ANOVA F score based on the ratios of their variances In addition to the target ML model, which may be opaque (i.e. black box), the transparent internals of another ML model may provide feature importances. For example, the following ML models have feature transparency. A random forest model is an ensemble of different decision trees. Adaptive boosting (AdaBoost) is another ensemble model in which constituent models (e.g. decision trees) are each differently specialized for respective extreme examples that would be peculiar and difficult for a single generalized model to accurately inference.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
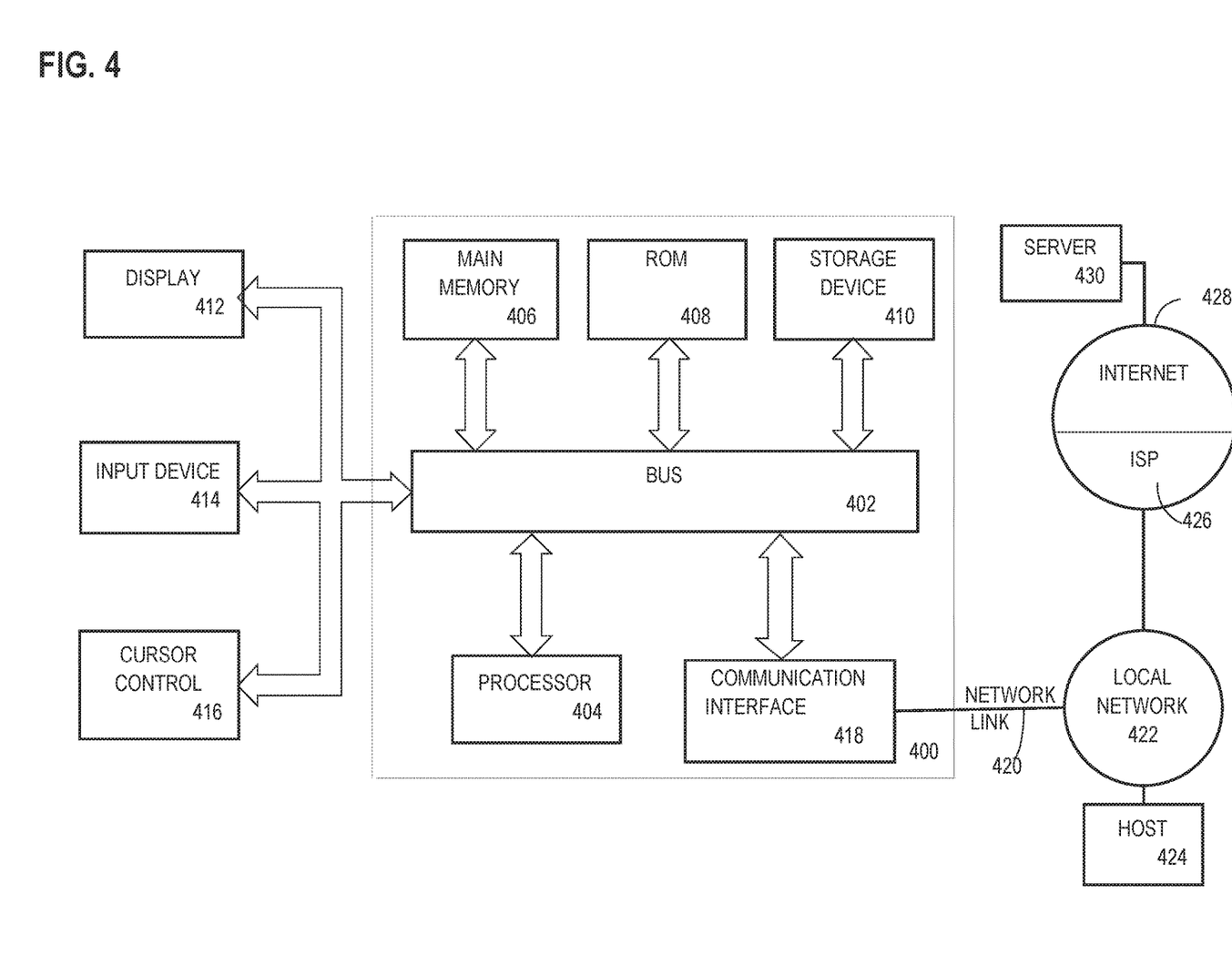
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
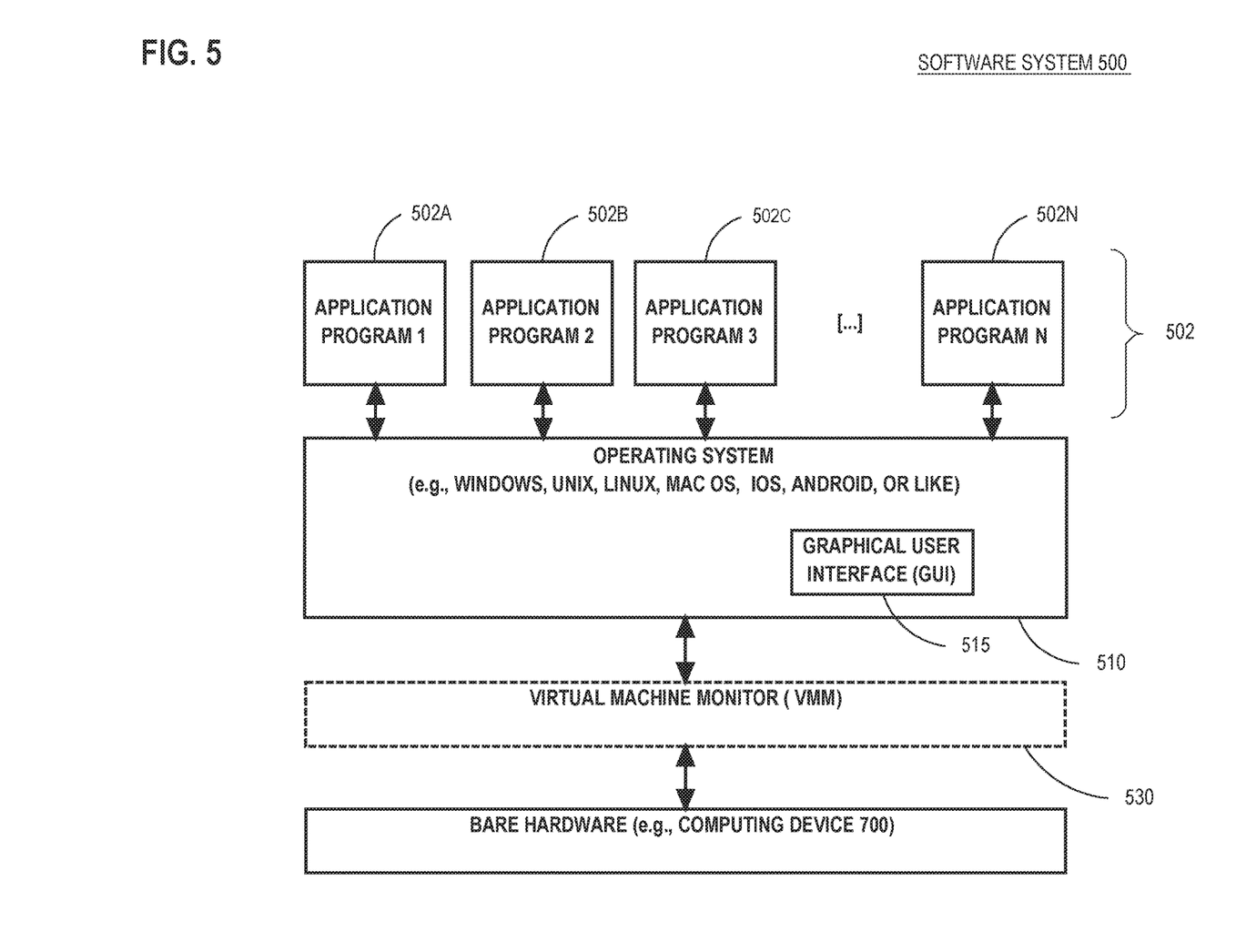
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
calculating, for each feature of a plurality of features of a training dataset, based on
statistics of values, of the feature, that occur in the training dataset:
a first feature relevance score based on a first feature relevance scoring function, and
a second feature relevance score based on a second feature relevance scoring function;
calculating, for each feature of the plurality of features:
a first rank based on the first feature relevance scores of the plurality of features, and
a second rank based on the second feature relevance scores of the plurality of features;
generating a sequence of distinct subsets of the plurality of features based on the first ranks of the plurality of features and the second ranks of the plurality of features, wherein each distinct subset in the sequence of distinct subsets of the plurality of features has a distinct size;
for each distinct subset of the sequence of distinct subsets of the plurality of features:
configuring a machine learning (ML) model to accept the distinct subset of the plurality of features,
training the ML model based on said configuring the ML model, and
calculating a fitness score based on said training the ML model;
selecting a most accurate subset of features that provided a highest training accuracy of the sequence of distinct subsets of the plurality of features;
configuring and training the ML model based on the most accurate subset of features.

2. A method comprising:
calculating, for each feature of a plurality of features of a training dataset, a feature relevance score based on:
a feature relevance scoring function, and
statistics of values, of the feature, that occur in the training dataset;
calculating, for each feature of the plurality of features, a rank based on the feature relevance scores of the plurality of features;
generating a sequence of distinct subsets of the plurality of features based on the ranks of the plurality of features, wherein each distinct subset in the sequence of distinct subsets of the plurality of features has a distinct size, wherein the distinct sizes of the sequence of distinct subsets of the plurality of features comprises an exponential sequence of sizes;
for each distinct subset of the sequence of distinct subsets of the plurality of features:
configuring a machine learning (ML) model to accept the distinct subset of the plurality of features,
training the ML model based on said configuring the ML model, and
calculating a fitness score based on said training the ML model;
selecting a most accurate subset of features that provided a highest training accuracy of the sequence of distinct subsets of the plurality of features;
configuring and training the ML model based on the most accurate subset of features.

3. The method of claim 2 wherein for each feature of the plurality of features, the feature relevance scoring function correlates the feature to a prediction target that the ML model may be trained to infer.

4. The method of claim 3 wherein for each feature of the plurality of features, correlating the feature to the prediction target comprises calculating mutual information between the feature and the prediction target.

5. The method of claim 3 wherein for each feature of the plurality of features, correlating the feature to the prediction target is based on an f-score.

6. The method of claim 3 wherein said prediction target comprises a classification label.

7. The method of claim 3 wherein said prediction target comprises a regression.

8. The method of claim 2 wherein said calculating the feature relevance score is based on an impact of the feature upon accuracy of the ML model.

9. The method of claim 8 wherein said impact of the feature upon accuracy of the ML model is based on adaptive boosting.

10. The method of claim 2 wherein each distinct subset in said sequence of distinct subsets of the plurality of features comprises the previous distinct subset in said sequence of distinct subsets of the plurality of features.

11. The method of claim 2 wherein training of the ML model is limited to said distinct subset of the plurality of features of the training dataset.

12. The method of claim 2 wherein the size of the sequence of distinct subsets of the plurality of features is the same as the size of the plurality of features.

13. The method of claim 2 wherein said calculating, for each distinct subset of the sequence of distinct subsets of the plurality of features, the fitness score based on training the ML model comprises distributing a respective plurality of distinct subsets of the sequence of distinct subsets to each processor of a plurality of processors.

14. The method of claim 13 wherein said respective plurality of distinct subsets of the sequence of distinct subsets are evaluated by said processor in descending order of distinct subset size.

15. The method of claim 14 wherein a first processor of the plurality of processors steals a largest pending distinct subset from a second processor of the plurality of processors.

16. One or more non-transitory computer-readable media storing instructions that, when executed by one or more processors, cause:
- calculating, for each feature of a plurality of features of a training dataset, based on
  - statistics of values, of the feature, that occur in the training dataset:
  - a first feature relevance score based on a first feature relevance scoring function, and
  - a second feature relevance score based on a second feature relevance scoring function;
- calculating, for each feature of the plurality of features:
  - a first rank based on the first feature relevance scores of the plurality of features, and
  - a second rank based on the second feature relevance scores of the plurality of features;
- generating a sequence of distinct subsets of the plurality of features based on the first ranks of the plurality of features and the second ranks of the plurality of features, wherein each distinct subset in the sequence of distinct subsets of the plurality of features has a distinct size;
- for each distinct subset of the sequence of distinct subsets of the plurality of features:
  - configuring a machine learning (ML) model to accept the distinct subset of the plurality of features,
  - training the ML model based on said configuring the ML model, and
  - calculating a fitness score based on said training the ML model;
- selecting a most accurate subset of features that provided a highest training accuracy of the sequence of distinct subsets of the plurality of features;
- configuring and training the ML model based on the most accurate subset of features.

17. One or more non-transitory computer-readable media storing instructions that, when executed by one or more processors, cause:
- calculating, for each feature of a plurality of features of a training dataset, a feature relevance score based on:
  - a feature relevance scoring function, and
  - statistics of values, of the feature, that occur in the training dataset;
- calculating, for each feature of the plurality of features, a rank based on the feature relevance scores of the plurality of features;
- generating a sequence of distinct subsets of the plurality of features based on the ranks of the plurality of features, wherein each distinct subset in the sequence of distinct subsets of the plurality of features has a distinct size, wherein the distinct sizes of the sequence of distinct subsets of the plurality of features comprises an exponential sequence of sizes;
- for each distinct subset of the sequence of distinct subsets of the plurality of features:
  - configuring a machine learning (ML) model to accept the distinct subset of the plurality of features,
  - training the ML model based on said configuring the ML model, and
  - calculating a fitness score based on said training the ML model;
- selecting a most accurate subset of features that provided a highest training accuracy of the sequence of distinct subsets of the plurality of features;
- configuring and training the ML model based on the most accurate subset of features.

18. The one or more non-transitory computer-readable media of claim 17 wherein for each feature of the plurality of features, the feature relevance scoring function correlates the feature to a prediction target that the ML model may be trained to infer.

19. The one or more non-transitory computer-readable media of claim 17 wherein said calculating the feature relevance score is based on an impact of the feature upon accuracy of the ML model.

20. The one or more non-transitory computer-readable media of claim 17 wherein said calculating, for each distinct subset of the sequence of distinct subsets of the plurality of features, the fitness score based on training the ML model comprises distributing a respective plurality of distinct subsets of the sequence of distinct subsets to each processor of a plurality of processors.

* * * * *